July 12, 1938.  J. M. PEARSON  2,123,545

ELECTRICAL MEASURING METHOD AND APPARATUS

Filed March 7, 1935  2 Sheets-Sheet 1

WITNESS:
Robt R Mitchel.

INVENTOR
John M. Pearson
BY
Busser & Harding
ATTORNEYS.

July 12, 1938.  J. M. PEARSON  2,123,545
ELECTRICAL MEASURING METHOD AND APPARATUS
Filed March 7, 1935  2 Sheets-Sheet 2

WITNESS:

INVENTOR
John M. Pearson
BY
ATTORNEYS.

Patented July 12, 1938

2,123,545

UNITED STATES PATENT OFFICE 2,123,545

ELECTRICAL MEASURING METHOD AND APPARATUS

John M. Pearson, Aldan, Pa., assignor to Sun Oil Company, Philadelphia, Pa., a corporation of New Jersey Application March 7, 1935, Serial No. 9,907

21 Claims. (Cl. 175—183)

This invention relates to a method and apparatus for making determination of currents flowing in the earth, particularly in the vicinity of underground conductors such as pipe lines, the electrolytic corrosion of which it is desired to avoid.

Wherever there occur electrical power systems utilizing ground return circuits or metallic return circuits from which leakage of current into the earth takes place, ground currents exist even at very considerable distances from the points where such currents mainly enter and leave the ground. If a metallic conductor of substantial length, such as a pipe line having joints which are conductive to a greater or less degree depending upon their nature, is located in the ground in the vicinity of such stray ground currents, that conductor will, to a considerable extent, short circuit such currents due to its better conductivity than the ground, with the result that it may carry currents of considerable magnitude which may enter and leave at various points depending entirely on the configuration of the entire system, including such conductor, sources and various portions of the ground itself, which may vary substantially in conductivity. Furthermore, the configuration of such electrical system is not constant as, for example, where there exists an electrical railway, the electrical configuration of which varies with the travel of cars. Since electrical railways generally use direct current, they constitute a particularly annoying factor in the matter of electrolysis, since the direct currents are far more destructive than alternating currents. In general, any conductor at a location where it is losing current (namely, where it is positive with respect to the surrounding soil), will be rapidly corroded by electrolytic action. When the complete configuration of an electrical system of this type is known, together with its periodic variations, it is possible to avoid electrolysis, for example, by making suitable electrical connections between the pipe line and sources or between various parts of the disturbing sources.

It is the object of the present invention to provide an apparatus which may be used for the determination of the direction of flow and comparative strengths of currents involved in configurations of the type above noted, the determinations being made with the object of avoiding damaging electrolysis. Since the apparatus is particularly useful in connection with pipe lines, it will be described primarily with respect to the electrolytic problems arising in connection with such lines, although it will be understood that the invention is applicable to the solving of similar problems in connection with other structures.

The apparatus and method are particularly adapted for the solution of two problems, first, the determination of the relative amount of current flowing into or out of a pipe line or other similar structure, and secondly, the determination of the direction of flow of sheet currents through the earth at points remote from conductors or other disturbing influences. The apparatus disclosed herein, however, is adapted for various other uses connected with problems of electrolysis, particularly because of its quite substantial range. Among such other uses may be noted the calibration of apparatus in which polarizing types of ground stakes are used.

Detailed objects of the invention, particularly relating to circuit arrangements whereby the various necessary determinations may be most readily made, will be apparent from the following description read in conjunction with the accompanying drawings, in which:

Fig. 1 indicates in a simplified diagram the principle of use of the apparatus in determining flow conditions about a pipe line;

Figure 1:
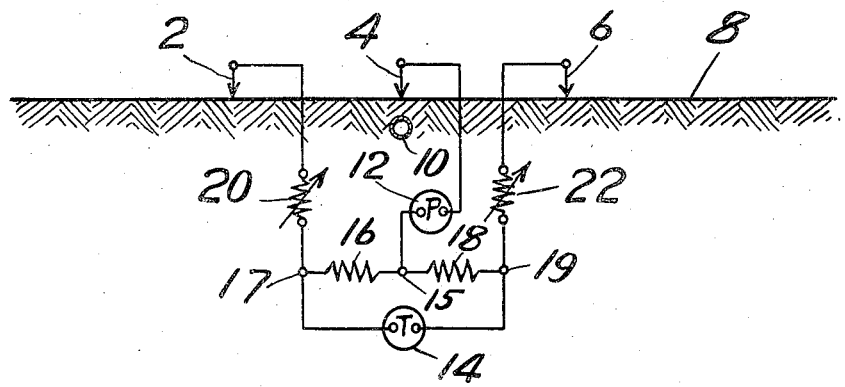
Figures 2, 3:
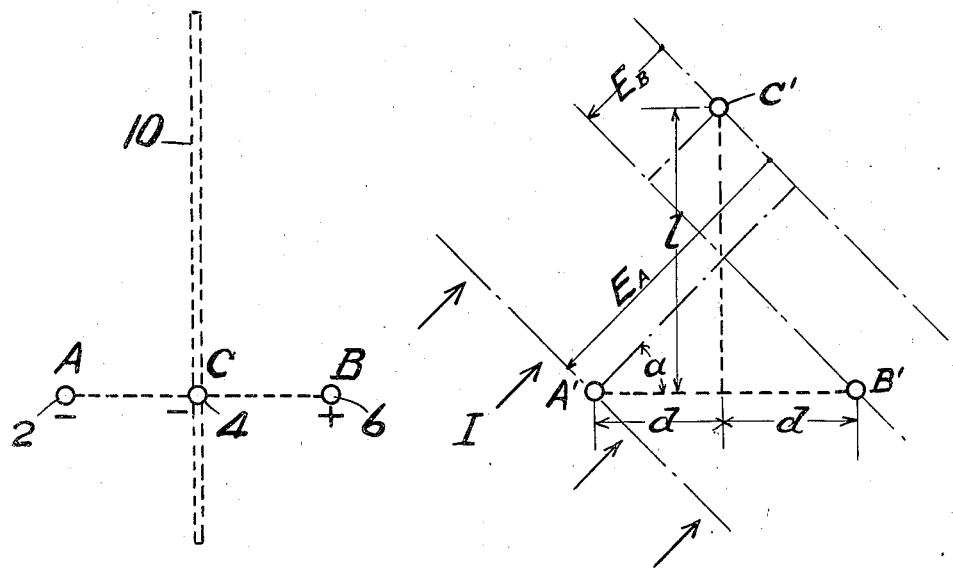
Fig. 2 is a plan diagram showing the relationship of electrodes to the pipe line.
Fig. 3 is a plan diagram explanatory of the use of the apparatus for determining the direction of flow of sheet currents through the earth.

Referring first to Fig. 1; 2, 4, and 6 represent, respectively, electrodes which are adapted to make electrical contact with the ground, these electrodes being of non-polarizing type, for example, of the saturated copper-copper sulphate type. These electrodes may be placed either as indicated in Fig. 2 or Fig. 3 at the positions designated A, C, and B and A', C', and B', respectively. The arrangement illustrated in Fig. 2 is used when it is desired to obtain measurements indicating current distribution about a buried pipe line indicated at 10, in which case the center electrode at the position C is placed on the surface above the pipe line, while electrodes 2 and 6 are placed at A and B, respectively, equidistant from C and on opposite sides of the pipe line at convenient distances, for example, of the order of fifteen feet. The second arrangement which is indicated in Fig. 3 will be referred to hereafter and is used when it is desired to determine the direction of sheet currents through the earth.

Referring first to the making of determinations about a pipe line and specifically to Figs. 1 and 2, it will be noted that the central electrode 4 is connected through a meter 12 to a point intermediate two equal resistances 16 and 18, which are shunted across a meter 14 and which are connected at their respective ends through variable resistances 20 and 22 to the respective electrodes 2 and 6. Resistances 20 and 22 are provided to balance the network to which the meters 12 and 14, hereinafter referred to as the pipe and transverse meters, respectively, are connected, so that the current operating one meter will have no component flowing through the other meter. In other words, adjustment of resistances 20 and 22 is so made that if the earth currents produce a current passing through meter 12 to deflect it, such meter current will be equally divided between the equal resistances 16 and 18 and consequently will produce no deflection of meter 14. This adjustment obviously results when the total resistance between junction 17 and electrode 4 is equal to the total resistance between junction 19 and electrode 4. Since such adjustment would obviously correspond to a condition of no deflection of meter 14 if a source of voltage is introduced in series with meter 12, it follows from the reciprocity theorem that a voltage in series with meter 14 would not produce any deflection of meter 12, or, in other words, the current producing a deflection of meter 14 would have no component through meter 12.

The operation of the device can be understood by considering a current transverse to the pipe line flowing from left to right. If the ground in the vicinity of the pipe line has a uniform resistance, the potential drop along the ground between terminals 2 and 4 and between terminals 4 and 6 will be equal. Because of the adjustment mentioned above, the resistance of electrode 2 plus the resistance 20 is equal to the resistance of electrode 6 plus the resistance 22. Consequently, the center point 15 between resistances 16 and 18 will be at the same potential as electrode 4 and the pipe meter will show no deflection, whereas the transverse meter will have a deflection proportional to the potential between terminals 2 and 6.

If in addition to this transverse current, a current is leaving the pipe line and flowing to a conductor remote from the pipe line as compared with the spacing of electrodes 2 and 6, this current will flow substantially symmetrically on opposite sides of the pipe line so that terminals 2 and 6 will have the same potential so far as the latter current is concerned, which potential will be lower than that of terminal 4 due to the current leaving the pipe. By reason of the balance of the circuit, the transverse meter will not receive any component of this current, whereas the pipe meter will deflect in proportion to the difference in potential between terminal 4 and terminals 2 and 6 due to the current leaving the pipe.

The currents in the measuring circuit will obviously be proportional to the potentials that would exist on the ground with the circuit absent. Since experiment shows that a set-up of this type is linear, the deflections of the meters can be reduced to the potentials that would be obtained by a null method using, for example, potentiometers, if the circuit is calibrated by a substitution method. This may be readily understood when it is considered that, because of linearity, the earth carrying currents may be replaced by a fictitious source of potential and resistance in series connected between electrodes 2 and 6 so far as meter 14 is concerned, and by a direct short circuiting connection between electrodes 2 and 6 with the fictitious source between this short and electrode 4 so far as meter 12 is concerned. For purposes of such calibration a battery is adapted to be inserted in series with the pipe meter and the deflection of this meter (multiplied suitably as hereafter explained) is read. The battery voltage is also measured. The ratio of battery voltage to the difference of readings of the meter 12 after and before insertion of the battery is then the factor by which the meter readings must be multiplied to get the open circuit potentials due to current leaving the pipe. This correction takes into account the drops in the circuit due to the fact that current-taking instruments are used.

The transverse meter is similarly calibrated, the same battery being introduced in series with either resistance 20 or 22, and the pipe meter circuit being open. This last is necessary since the battery is introduced asymmetrically. A correction factor, similar to that above, will be thus obtained for reducing the readings of meter 14 to open circuit potentials between 2 and 6.

The potentials due to current flow from the pipe are of primary interest. Determination of the magnitudes of these, together with their variations with respect to time at various localities along the pipe line and with measurements of the currents flowing in the pipe line made, for example, by the use of the method and apparatus described and claimed in my application Ser. No. 9,906, filed of even date herewith, now Patent No. 2,103,636, give indications from which sources of disturbing currents may be located and from which corrective measurements may be deduced. The transverse readings are desirable for correlation to determine, for example, whether they vary with the pipe meter readings in time or whether they vary otherwise or remain constant. Besides measurements made along the pipe line, the use of the method indicated in Fig. 3 gives an indication of the direction of current flow at points remote from the pipe line. By means of various set-ups and the application of the interpretation mentioned below, sources of disturbances may be readily located. Since the conditions vary with every configuration, it will not be profitable to describe in detail such considerations herein. It will be obvious to those skilled in the art, given any particular set of conditions and tabulation of readings of the various meters, how to make deductions therefrom.

It is necessary that observations of the instruments 12 and 14 be made simultaneously, since, in general, the currents which are flowing very continuously, due to changes in the configuration of the electrical system involved. It is obvious, therefore, that care must be taken to insure the obtaining of comparable results. The accuracy of the results obtained depends, of course, upon the skill of the observers, but a considerable part of this invention is concerned with making manipulations easy so as to facilitate the obtaining of proper interpretable results even by relatively unskilled observers.

The important alternative use of the instrument indicated in Fig. 3 is the determination of the direction of earth currents in a localized region which may be legitimately assumed to be homogeneous, in other words, distant from conducting bodies of such magnitude as might cause the current flow to vary from straight lines in the region immediately about the electrode setup.

Assuming a sheet current I flowing in the direction indicated by the arrows in this figure relative to the electrodes 2, 6, and 4, respectively at A', B', and C', the equipotential surfaces will be perpendicular to the direction of flow and if the medium is homogeneous the potential drops $E_A$ and $E_B$, taken as indicated by the arrows, will be proportional to the spacing of the electrodes A' and C' and B' and C' in the direction of current flow. If $\alpha$ is the angle between the direction of flow and a line joining A' and B', $d$ is half the distance between A' and B', and $l$ is the distance between C' and the line joining A' and B', then from the geometry of the configuration it is obvious that:

$$\tan \alpha = \frac{d \cdot (E_A + E_B)}{l \cdot (E_A - E_B)}$$

The numerator $(E_A + E_B)$ is read by the pipe meter 12 and the denominator $(E_A - E_B)$ by the transverse meter 14. Accordingly, taking readings with due regard to sign gives the direction of flow of the sheet current. By arranging the electrodes in configurations such as indicated in Fig. 3, the spacings being preferably of the order of 100 to 150 feet, over a territory which is being investigated, a map can be drawn giving at numerous points the direction of flow of the sheet currents. From such map, taken with results obtained along a pipe line, there may be obtained the data necessary to cure undesirable electrolytic conditions.

Figure 4:
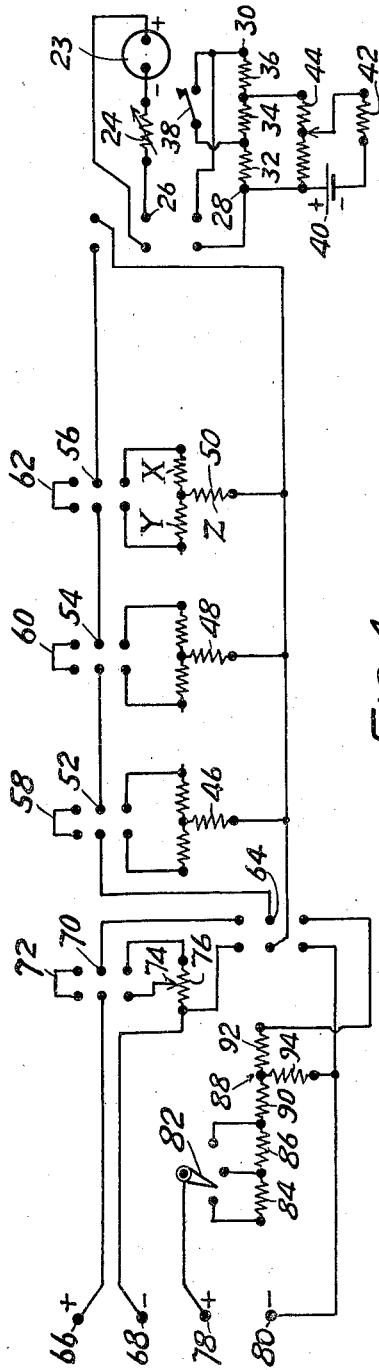
Fig. 4 is a wiring diagram illustrating certain attenuating and auxiliary elements connected with each of the meters used.

The instruments 12 and 14 indicated in Figs. 1 and 3 are not actually simple ammeters, though from the standpoint of the discussion above they may be so regarded, but comprise ammeters and rather elaborate networks designed to facilitate the making of readings under the varied conditions encountered in operation. The range of potentials is enormous and consequently the "meters" 12 and 14 must have ranges of the order of 100,000 to 1. Accordingly, provision is made to secure a range of 1,000,000 to 1 with the possibility of full scale deflections for voltages differing by powers of 10 within such range. Fig. 4 illustrates a circuit which may be taken to represent either of the meters 12 and 14.

The ultimate measuring instrument in Fig. 4 consists of a microammeter which may, for example, have a conventional 12½—0—12½ scale. Such meter may have an internal resistance somewhat less than 300 ohms and requires a critical external damping resistance of 2,000 ohms. Since the coil of the microammeter is wound with copper wire and therefore has a variable temperature coefficient, provision is made to insure that the input resistance of the meter is of some known value, for example, 300 ohms. To achieve this end, the microammeter indicated at 23 is permanently in series with a variable resistance 24, the series circuit terminating at the blades of a double-pole double-throw switch 26. Where the switch is thrown downwardly as viewed in Fig. 4, the meter 23 and resistance 24 form one arm of a Wheatstone bridge, the other arms of which are indicated at 32, 34, and 36, which may be fixed resistances of 300 ohms having a very low temperature coefficient. The meter branch of the circuit is connected to the terminals 28 and 30 of the bridge and key 38 may connect the point between arms 32 and 34 and terminal 30. Current for the bridge is supplied by a battery 40 through a resistance 42 and a potentiometer 44. Before any readings are to be taken, resistance 24 is adjusted so that depression of key 38 produces no change in deflection of the microammeter 23.

When that condition is attained, the bridge is balanced and consequently the total resistance of 23 and 24 is exactly 300 ohms. The double-pole, double-throw switch 25 may then be thrown to the upper position connecting the meter to the attenuating network.

The attenuating network includes three sections 46, 48, and 50, each comprising a pair of series arms and a shunt arm. These sections may be brought into series with each other or may be shunted out so as to give attenuations ranging from $10^{-1}$ to $10^{-6}$ in powers of 10, section 46 having an attenuation of $10^{-1}$, section 48 of $10^{-2}$, and section 50 of $10^{-3}$.

Each of the sections is so designed that its input resistance when it is feeding into the meter resistance of 300 ohms, will be 300 ohms, so that, irrespective of the combination of sections used, the input resistance, looking towards the meter, will invariably be 300 ohms, or, of course, any other fixed value desired which will be generally designated as $R_M$. At the same time, each of the sections is so designed that its input, looking away from the meter, will be the critical external damping resistance when it is feeding into a resistance equal to the critical damping resistance which, as mentioned, may be 2000 ohms or some other value which will be designated $R_C$. If $n$ is the desired attenuation ratio of any particular section looking towards the meter, that is, the ratio of output current to current through the critical resistance shunted across its input, then the desired results may be attained by giving the resistances X, Y, Z indicated in Fig. 4 the values:

$$X = \frac{R_C - nR_M}{1+n}$$

$$Y = \frac{R_M - nR_C}{1+n}$$

$$Z = \frac{n}{1-n^2} \cdot (R_M + R_C)$$

Since $n$ is different for each of the sections, it will be obvious that the three sections are quite different in their constants.

Double-pole, double-throw switches 52, 54, and 56 are provided to either throw the various sections into the circuit or by-pass them through shunts 58, 60, and 62.

The input terminals of the attenuating circuit are connected to the blades of a double-pole, double-throw switch 64. When this switch is thrown to its upper position, the meter is arranged to act as an ammeter. If the double-pole double-throw switch 70 is thrown to its upper position, then, because of the shunt 72, the input side of either the meter or the first of the attenuating sections which is active will be connected directly across the terminals 66 and 68. If the switch 70, however, is in its lower position, then a resistance 76 equal to the critical resistance is thrown across the input of the attenuating network and terminal 66 is connected to the potentiometer slider 74. By the adjustment of this slider, the microammeter may be made to read in the most advantageous part of its scale. Since the meter is calibrated after the potentiometer is set, it is obvious that the setting of this slider may be quite arbitrary so long as it is fixed in position throughout all of the readings following the calibration. The Ayrton shunt 76 maintains the critical damping resistance across the meter terminals.

If the switch 64 is thrown to its lower position, then the apparatus may function as a volt meter. To secure this end, a network 88 is provided whose resistances 92 and 94 have the same values as the X and Z resistances of section 46. Its arm 90 has a value equal to the Y resistance of section 46 plus 700 ohms, so that the input resistance of the section 88 is 1,000 ohms. Resistances 84 and 86, which may be brought into or out of operation by the switch 82, have respective resistances of 90,000 ohms and 9,000 ohms. Accordingly, this network arrangement serves as a voltmeter multiplier, the voltmeter terminals being 78 and 80. At the same time substantially the critical damping resistance is maintained across the meter.

Figure 5:
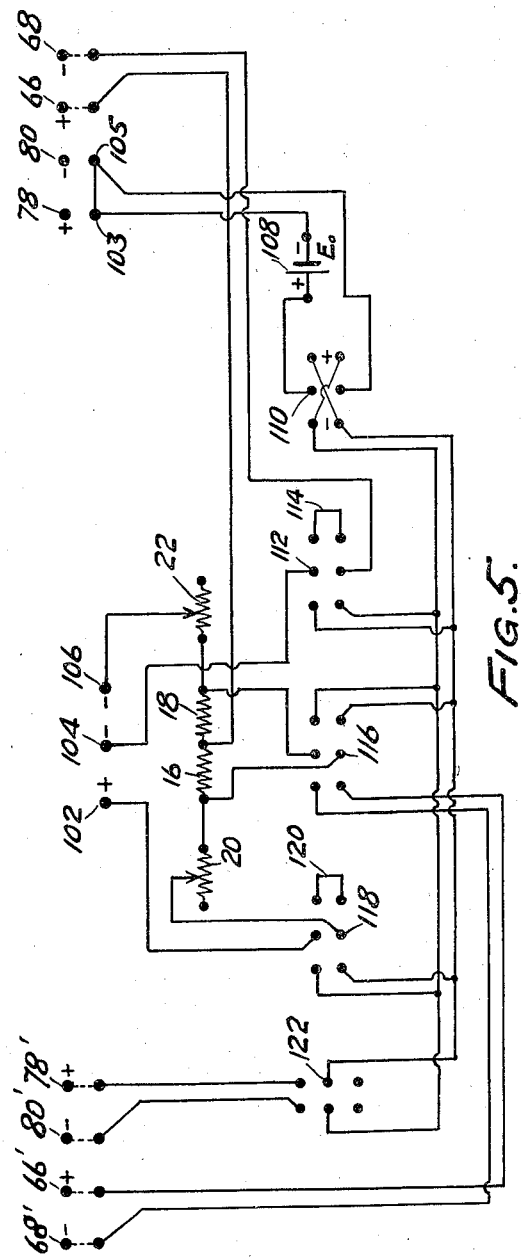
Fig. 5 is a wiring diagram showing certain input connections for the meters and arrangements whereby testing and adjustments may be effected.

As above indicated, Fig. 4 illustrates the connections of both meters 12 and 14. The terminals of meter 12, namely, the pipe meter, are indicated in Fig. 5 at 66, 68, 78, and 80, while the corresponding terminals of the transverse meter 14 are indicated at 66', 68', 78', and 80'. Fig. 5 illustrates wiring connections which may be contained in the same box with the meter and which serve to secure substitutions necessary in securing the calibrations previously described and other tests of the circuit. Fig. 5, in other words, shows the switch connections omitted from Fig. 1. The resistances 16, 18, 20, and 22 have already been described, while terminals 102, 104, and 106 are arranged to be connected to the respective electrodes 2, 4, and 6. Battery 108 furnishes the potential E₀ heretofore referred to. The voltage terminals 78 and 80 of meter 12 are not ordinarily used and the terminals 103 and 105 are not connected to them but are short-circuited to form part of the battery circuit. These terminals are convenient if additional battery voltage is desired, since batteries may be inserted between them.

The reversing switch 110 is used to introduce the battery into various circuits with its polarity reversed so that calibration readings may be obtained independently of the meter readings, which may include external disturbances of the type later to be measured.

In order to first obtain an equalization of the resistances as indicated above by adjustment of the circuit variable resistances 20 and 22, the switch 118 is thrown to the right so that it is shorted by 120. Switch 112 is also thrown to the right so that it is shorted by 114. Switch 116 is thrown to the right so that the battery, by manipulation of switch 110, may be used to apply reversed direct current across the resistances 16 and 18. The meter 12 now functions as a galvanometer in the bridge circuit and adjustment of 20 and 22 is made until balance is indicated by non-deflection of the galvanometer, when the switch 10 is closed in either direction. It may be noted that switch 116 at this time takes meter 14 out of the circuit, the battery being located in the position of this meter.

After balance is attained, switches 112 and 116 are thrown to the left. As a result, the battery 108 is put in series with meter 12 and meter 14 is placed in the circuit across resistances 16 and 18. At this time it is necessary that the multiplying means be used to avoid damage to pipe meter 12. Switch 10 may now be manipulated to throw the potential E₀ into the circuit so that the deflection of the pipe meter occasioned by the introduction of the battery voltage in the circuit may be determined. This is necessary because of the arbitrary adjustment of potentiometer 74. However, once this calibration has been made, it may be used so long as the potentiometer is undisturbed. Because of the balanced condition of the circuit with respect to the meter 14, it is obvious that this manipulation of switch 110 should not affect the reading of the transverse meter. In order to calibrate meter 14, switch 112 is opened, thereby taking the pipe meter out of the circuit, and switch 116 is thrown to the left. 118, heretofore in the right-hand position, is now thrown to the left-hand position, putting the battery asymmetrically into the circuit as indicated previously. By the manipulation of switch 10 and the noting of the readings of the transverse meter, suitably multiplied, there may be determined the response of this meter to the introduction of the voltage E₀.

For the purpose of determining the ground potential readings, switches 112 and 118 are thrown to the right and switch 116 is thrown to the left so that connections are made as indicated above.

With the switches arranged as just mentioned, the battery may be calibrated by moving switch 122 to its upper position and closure of switch 110, whereupon the battery 108 is thrown across the voltage terminals 78' and 80' of the transverse meter circuit 14. The battery voltage may thus be accurately ascertained and used in determination of the calibration.

Two operators simultaneously reading the pipe and transverse meter, respectively, can record their readings for future interpretation along with the calibrations of the circuits made as described above. The readings of the pipe meter, when multiplied by a certain factor, gives the current in amperes per foot or other suitable unit which is entering or leaving the pipe in the neighborhood of the electrodes 2, 4, and 6. The factor involves the geometric spacing of the electrodes, the depth of the pipe line, the specific resistance of the surrounding earth and the calibration of the circuit. The specific resistance of the surrounding earth is measured by any one of several well known means designed for this purpose. The exact form of the correction factor to be applied to the pipe meter readings to reduce them to amperes per foot of current interchanged between the pipe and the earth, is given in the formula:

$$i_p = 30.48 \frac{\pi f_p I_p}{\rho \log_e \frac{\sqrt{d^2+h^2}}{h}}$$

wherein:
  $d$ = electrode spacing in feet.
  $h$ = depth of pipe center in feet.
  $\rho$ = specific resistance of the earth in ohm-cms.
  $I_p$ = pipe meter reading in microamperes.
  $f_p$ = pipe meter correction factor converting microamperes to open circuit volts.
  $i_p$ = pipe current to (or from) ground in amperes per foot.

Owing to the way the pipe meter is connected in the circuit, i. e., with the negative terminal connected to electrode 4, the pipe meter readings will be positive when current is flowing from the earth to the pipe and negative when the current is leaving the pipe to enter the earth. This data is of value in determining the rate of damage at a particular point. For instance, a discharge of current by a six-inch pipe in excess of one milliampere per foot is likely to cause electrolysis damage in a substantially short time.

The readings of the transverse meter, when multiplied by a suitable factor, give the average current density in the neighborhood of the electrodes 2, 4, and 6 flowing through the earth at right angles to the pipe line. This factor is chosen to give the current in amperes per square foot or other suitable unit. This current is given by:

$$i_t = 30.48 \frac{f_t I_t}{2 d \rho}$$

wherein $d$ and $\rho$ are as given above and:

$I_t$=transverse meter readings in microamperes.

$f_t$=transverse meter correction factor converting microamperes to open circuit volts.

$i_t$=sheet current density perpendicular to the line in amperes per square foot.

Interpretations of the simultaneous readings can be made, for example, as follows:

If the pipe meter shows a discharge of current which increases in magnitude simultaneously with an increase of the reading in the positive operation of the transverse meter (see Figure 2) and vice versa, the conclusion is that the line is discharging current at the point of observation which is returning to a source on the side of the line upon which electrode 2 is placed. From other combinations of such correlated pipe and transverse meter readings one will get corresponding interpretations. At some points, the pipe and transverse meter readings may not vary simultaneously with time, a condition which gives the conclusion that the current transverse to the pipe is not due to the same source as the current which is entering or leaving the pipe at this point.

The last of the above formulae giving a suitable interpretation to $d$ applies also to calculations made from setups of the type indicated in Fig. 3, so that the rectangular components of sheet current density in amperes per square foot in the neighborhood of the electrodes may be determined.

By "neighborhood" of the electrodes is meant an area approximately five to ten electrode spacings on the side, centering about electrode 4. The results given by the measurements will be an average, approximately, for such an area.

In order to secure a most complete type of information, it is desirable to have more than one set of meters, for example, at different locations along a pipe line, or both along a pipe line and at one or more points remote therefrom. Observers at each station can then take readings of the two meters and by correlating their observations with respect to time by radio, visual, or audible signals, considerable information may be gained as to the complete electrical configuration of the vicinity. Wide ranges of earth resistivities are encountered and the type of instrument described herein is accordingly particularly valuable. Not only the direction, but the actual magnitudes of the currents can be plotted and the proximity of the source and the direction of its location can be deduced. One valuable use of the method just indicated is the location of a substation operating in a mine underground, of which there may be no surface indication whatever.

Another use of this meter arrangement is in the calibration of earth potential measuring stakes which are used, for example, in connection with recording meters. If an iron ground stake is driven at a certain distance from a pipe line and connected to the pipe line through an indicating meter, the meter will indicate the sum of the potentials existing in the circuit. These potentials consist of the electrochemical potentials of the pipe and the iron stake, respectively, and the RI drop between the iron stake and the pipe. This RI drop, in general, will be due to two components, first, that due to the sheet current flowing transversely to the pipe line, producing a gradient over the spacing between the pipe line and stake, and that due to the part of the earth current contributed by the pipe itself to the surrounding earth. In the case of such arrangement, the earth current meters may be used as follows to determine all three potentials producing the deflection of the indicating meter.

The earth current meter will be set up, in accordance with Fig. 2, in the immediate neighborhood of the iron stake, and the usual readings are made with the addition that the readings of the indicating meter connected to the stake are recorded simultaneously with those of the transverse and pipe meters. The corrections of the indicating meter readings and the corrections of the transverse meter readings are applied to reduce them both to open circuit voltages, the former being accomplished as described in my application mentioned above, filed of even date herewith. The transverse meter readings, knowing the spacing between the terminals 2 and 6 when so corrected, give the gradient in volts per foot transverse to the pipe line. The gradients deduced from the individual transverse meter readings are then multiplied by the distance between the pipe line and ground stake and subtracted algebraically from the corresponding corrected indicating meter readings. This removes from the latter the component of the RI drop due to the transverse current. The reduced readings of the indicating meter are then plotted as ordinates with the readings of the pipe meter as abscissae. If the above reduction for transverse current has been correctly made, the points so plotted will lie on a straight line. This line is extended past the origin at which the pipe meter readings would be zero. The intersection of this line with the indicator meter reading axis will give the sum of the electrochemical potentials involved between the iron stake and the pipe line. This is true because when the pipe meter is reading zero, the component of the RI drop due to the pipe is also zero, and the only remaining potentials in the circuit are those due to electrochemical effects. For precise work, it is sometimes desirable to allow an iron ground stake to remain in the ground twelve hours or more prior to its calibration to avoid drift in its constants.

If, in the above calibration, it is found that the transverse current and the pipe current are related by a constant ratio, as is frequently the case, the readings of a recording meter connected to a ground stake and the pipe can be reduced to (a) the transverse current which is flowing and (b) the pipe current which is flowing in the neighborhood of the setup. If the pipe meter and transverse meter readings do not correlate with a fixed ratio with respect to time, it is usually necessary to relocate the point at which the ground voltage readings are to be made, or to place the ground stake immediately above the pipe to avoid the effects of the transverse sheet current so that the indicating meter will give indications proportional to the pipe current after correction for electrochemical effects.

A ground stake which has been placed and "aged" as above specified will not polarize to any appreciable extent during its use for readings over a considerable period of time.

What I claim and desire to protect by Letters Patent is:

1. The method of determining characteristics of current flow adjacent the surface of the ground including locating three electrodes in electrical contact with the ground, two of the electrodes being connected to a meter shunted by an impedance, and the third electrode being connected through a second meter to the impedance intermediate the ends thereof, balancing the circuit so that the second meter is non-responsive to variations in potential produced between the ends of said impedance and then observing simultaneously the indications of current flow through said meters.

2. The method of determining characteristics of current flow in the ground adjacent a conductor such as a pipe line buried near the surface including locating three electrodes in electrical contact with the ground, two of the electrodes having contact with the ground on opposite sides of the conductor and being connected to a meter shunted by an impedance, and the third electrode having contact with the ground adjacent the conductor and being connected through a second meter to the impedance intermediate the ends thereof, balancing the circuit so that the second meter is non-responsive to variations in potential produced between the ends of said impedance, and then observing simultaneously the indications of current flow through said meters.

3. The method of determining characteristics of current flow in the ground adjacent a conductor such as a pipe line buried near the surface including locating three electrodes in electrical contact with the ground, two of the electrodes having symmetrical contact with the ground on opposite sides of the conductor and being connected to a meter shunted by an impedance, and the third electrode having contact with the ground adjacent the conductor and connected through a second meter to the impedance intermediate the ends thereof, balancing the circuit so that the second meter is non-responsive to variations in potential produced between the ends of said impedance, and then observing simultaneously the indications of current flow through said meters.

4. The method of determining characteristics of current flow adjacent the surface of the ground including locating three electrodes in electrical contact with the ground, two of the electrodes being connected to a meter shunted by an impedance, and located symmetrically with respect to a surface line through the third electrode which is connected through a second meter to the impedance intermediate the ends thereof, balancing the circuit so that the second meter is non-responsive to variations in potential produced between the ends of said impedance, and then observing simultaneously the indications of current flow through said meters.

5. The method of determining the direction of current flow adjacent the surface of the ground including locating three electrodes in electrical contact with the ground, two of the electrodes being connected to a meter shunted by an impedance, and located symmetrically with respect to a surface line through the third electrode, located at one side of a line joining the first mentioned electrodes and which is connected through a second meter to the impedance intermediate the ends thereof, balancing the circuit so that the second meter is non-responsive to variations in potential produced between the ends of said impedance, and then observing simultaneously the indications of current flow through said meters.

6. The method of determining characteristics of current flow adjacent the surface of the ground including locating three electrodes in electrical contact with the ground, two of the electrodes being connected to a meter shunted by an impedance, and the third electrode being connected through a second meter to the impedance intermediate the ends thereof, balancing the circuit by adjustment of an impedance between at least one end of the first mentioned impedance and one of the first mentioned electrodes, so that the second meter is non-responsive to variations in potential produced between the ends of the first mentioned impedance, and then observing simultaneously the indications of current flow through said meters.

7. The method of determining the direction of current flow adjacent the surface of the ground including locating three electrodes in electrical contact with the ground, two of the electrodes being connected to a meter shunted by an impedance, and located symmetrically with respect to a surface line through the third electrode, located at one side of a line joining the first mentioned electrodes and which is connected through a second meter to the impedance intermediate the ends thereof, balancing the circuit by adjustment of an impedance between at least one end of the first mentioned impedance and one of the first mentioned electrodes, so that the second meter is non-responsive to variations in potential produced between the ends of the first mentioned impedance, and then observing simultaneously the indications of current flow through said meters.

8. The method of determining characteristics of current flow adjacent the surface of the ground including locating three electrodes in electrical contact with the ground, two of the electrodes being connected to a meter shunted by an impedance, and the third electrode being connected through a second meter to the impedance intermediate the ends thereof, balancing the circuit so that the second meter is non-responsive to variations in potential produced between the ends of said impedance, calibrating the apparatus by the insertion of known potentials, and then observing simultaneously the indications of current flow through said meters.

9. The method of determining characteristics of current flow adjacent the surface of the ground including locating three electrodes in electrical contact with the ground, two of the electrodes being connected to a meter shunted by an impedance, and the third electrode being connected through a second meter to the impedance intermediate the ends thereof, balancing the circuit by adjustment of an impedance between at least one end of the first mentioned impedance and one of the first mentioned electrodes, so that the second meter is non-responsive to variations in potential produced between the ends of the first mentioned impedance, calibrating the apparatus by the insertion of known potentials, and then observing simultaneously the indications of current flow through said meters.

10. In combination with three electrodes adapted to make electrical contact with the ground, a pair of meters, connections between one meter and two of said electrodes, an impedance shunting said meter, and connections from the third electrode through the second meter to the impedance intermediate the ends thereof, said second meter having electrode connections with the ground on its side remote from said third electrode only through said first two electrodes.

11. In combination with three non-polarizing electrodes adapted to make electrical contact with the ground, a pair of meters, connections between one meter and two of said electrodes, an impedance shunting said meter, and connections from the third electrode through the second meter to the impedance intermediate the ends thereof, said second meter having electrode connections with the ground on its side remote from said third electrode only through said first two electrodes.

12. In combination with three electrodes adapted to make electrical contact with the ground, a pair of meters, connections between one meter and two of said electrodes, an impedance shunting said meter, and connections from the third electrode through the second meter to the impedance intermediate the ends thereof, said second meter having electrode connections with the ground on its side remote from said third electrode only through said first two electrodes, there being a variable impedance in at least one of the connections between the first mentioned meter and one of the first mentioned electrodes.

13. In combination with three electrodes adapted to make electrical contact with the ground, a pair of meters, connections between one meter and two of said electrodes, an impedance shunting said meter, connections from the third electrode through the second meter to the impedance intermediate the ends thereof, said second meter having electrode connections with the ground on its side remote from said third electrode only through said first two electrodes, and means for inserting a known potential into the network for calibration purposes.

14. In combination with three electrodes adapted to make electrical contact with the ground, a pair of meters, connections between one meter and two of said electrodes, an impedance shunting said meter, connections from the third electrode through the second meter to the impedance intermediate the ends thereof, means for inserting a known potential into the network for calibration purposes, and means for measuring the value of said potential.

15. In combination with three electrodes adapted to make electrical contact with the ground, a pair of meters, connections between one meter and two of said electrodes, an impedance shunting said meter, and connections from the third electrode through the second meter to the impedance intermediate the ends thereof, said second meter having electrode connections with the ground on its side remote from said third electrode only through said first two electrodes, at least one of said meters comprising a low reading ammeter and an attenuating multiplier network associated therewith, the network being designed to insure constant input impedance, equal to the input impedance of the ammeter unshunted by the network, for various ranges.

16. In combination with three electrodes adapted to make electrical contact with the ground, a pair of meters, connections between one meter and two of said electrodes, an impedance shunting said meter, and connections from the third electrode through the second meter to the impedance intermediate the ends thereof, at least one of said meters comprising a low reading ammeter and an attenuating multiplier network associated therewith and shunting said ammeter, the network being designed to insure constant input impedance, equal to the input impedance of the ammeter unshunted by the network, for various ranges, and providing a substantially constant damping shunt for the ammeter.

17. In combination with three electrodes adapted to make electrical contact with the ground, a pair of meters, connections between one meter and two of said electrodes, an impedance shunting said meter, and connections from the third electrode through the second meter to the impedance intermediate the ends thereof, at least one of said meters comprising a low reading ammeter and an attenuating multiplier network associated therewith, the network being designed to insure constant input impedance, equal to the input impedance of the ammeter unshunted by the network, for various ranges, and means for adjusting the input impedance of the ammeter to a given value.

18. In combination with a pair of non-polarizing electrodes, a meter connected thereto, said meter comprising a low reading ammeter and an attenuating multiplier network associated therewith and shunting said ammeter, the network being designed to insure constant input impedance, equal to the input impedance of the ammeter unshunted by the network, for various ranges, and providing a substantially constant damping shunt for the ammeter.

19. In combination with a pair of non-polarizing electrodes, a meter connected thereto, said meter comprising a low reading ammeter and an attenuating multiplier network associated therewith, the network being designed to insure constant input impedance, equal to the input impedance of the ammeter unshunted by the network, for various ranges, and means for adjusting the input impedance of the ammeter to a given value.

20. The method of determining components of potential indicated by a meter in a circuit connected to the ground in such fashion that electrochemical potentials may exist therein including locating in the vicinity of such ground connections three electrodes in non-polarizing electrical contact with the ground, two of the electrodes being connected to a meter shunted by an impedance, and the third electrode being connected through a second meter to the impedance intermediate the ends thereof, balancing the circuit so that the second meter is non-responsive to variations in potential produced between the ends of said impedance and then observing simultaneously the indications of the first-named meter and of current flow through the last two meters.

21. The method of determining characteristics of current flow adjacent the surface of the ground including locating at spaced positions separate sets of apparatus each comprising three electrodes in electrical contact with the ground, two of the electrodes being connected to a meter shunted by an impedance, and the third electrode being connected through a second meter to the impedance intermediate the ends thereof, balancing in each set of apparatus its circuit so that its second meter is non-responsive to variations in potential produced between the ends of its impedance, and then observing simultaneously the indications of current flow through the meters of both sets of the apparatus.

JOHN M. PEARSON.